(12) United States Patent
Murase

(10) Patent No.: US 8,849,966 B2
(45) Date of Patent: *Sep. 30, 2014

(54) SERVER IMAGE CAPACITY OPTIMIZATION

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 12/577,961

(22) Filed: Oct. 13, 2009

(65) Prior Publication Data

US 2011/0088029 A1    Apr. 14, 2011

(51) Int. Cl.
G06F 15/177    (2006.01)
G06F 9/455    (2006.01)
G06F 9/50    (2006.01)

(52) U.S. Cl.
CPC .......... G06F 9/5077 (2013.01); G06F 9/45558 (2013.01); G06F 2009/45579 (2013.01)
USPC ........... 709/221; 709/201; 709/213; 709/217; 709/218; 709/219; 709/220; 709/222; 709/223; 709/224; 709/225; 709/226; 709/227; 709/228; 709/229; 709/248; 718/1; 718/100; 718/105; 707/E17.005; 707/E17.009; 707/E17.014; 707/649; 707/764; 707/827; 707/831; 707/899; 711/E12.017; 711/E12.07; 711/118; 711/147; 711/154

(58) Field of Classification Search
CPC . G06F 9/45558; G06F 4/5072; G06F 4/5077; G06F 2009/4557; G06F 2009/45579
USPC ......... 709/201, 213, 217, 218, 219, 220, 221, 709/222, 223, 224, 225, 226, 227, 228, 229, 709/248; 718/1, 100, 105; 707/E17.009, 707/E17.014, 649, E17.005, 3, 204, 764, 707/827, 831, 899; 711/162, 170, E12.001, 711/E12.002, E12.03, E12.103, 137, 114, 711/112, 154, E12.017, E12.07, 118, 147
IPC ....... G06F 9/45558,9/5072, 9/5077, 2009/4557, G06F 2009/45579
See application file for complete search history.

(56) References Cited

U.S. PATENT DOCUMENTS 6,098,129 A    8/2000 Fukuzawa et al.
7,051,121 B2    5/2006 Ohno et al.
(Continued)

OTHER PUBLICATIONS

3PAR Inc., "3PAR Server Provisioning Solutions", http://www.3par.com/SiteObjects/ A7B11BEED3AC16DF15CA5A82011BF265/3PAR-sp-ds-08.1.pdf., 2008, 3PAR Inc., 1 page.

Primary Examiner — Saket K Daftuar
(74) Attorney, Agent, or Firm — Mattingly & Malur, PC

(57) ABSTRACT

Embodiments of the invention provide a solution to optimize/minimize the total capacity of Gold Image within the entire datacenter which utilizes a scale-out type of storage systems. A method of server image provisioning comprises checking whether a gold image exists in a first storage system, the gold image being one of a real gold image or a virtual gold image; if no gold image exists in the first storage system, searching a remainder of the storage systems until a real gold image is found in a second storage system; after finding the real gold image in the second storage system, creating a virtual gold image in the first storage system, the virtual gold image in the first storage system being associated with the real gold image in the second storage system; and creating a snapshot volume in the first storage system based on the virtual gold image.

20 Claims, 17 Drawing Sheets

Logical Element Structure – Snapshot Volume Composition

(56) References Cited

U.S. PATENT DOCUMENTS

| | | |
|---|---|---|
| 7,287,132 B2 | 10/2007 | Takahashi et al. |
| 7,360,046 B2 | 4/2008 | Shono et al. |
| 7,383,405 B2 | 6/2008 | Vega et al. |
| 7,509,467 B2 | 3/2009 | Nagata et al. |
| 7,783,856 B2 * | 8/2010 | Hashimoto et al. ........... 711/173 |
| 7,805,600 B2 * | 9/2010 | Bucher et al. ..................... 713/2 |
| 8,082,406 B1 * | 12/2011 | Singh et al. ................... 711/162 |
| 2003/0217131 A1 * | 11/2003 | Hodge et al. .................. 709/223 |
| 2005/0240803 A1 | 10/2005 | Saika et al. |
| 2006/0031637 A1 | 2/2006 | Komikado et al. |
| 2007/0057958 A1 * | 3/2007 | Bucher et al. ................. 345/568 |
| 2008/0034365 A1 | 2/2008 | Dahlstedt |
| 2008/0134175 A1 * | 6/2008 | Fitzgerald et al. ................ 718/1 |
| 2008/0244205 A1 | 10/2008 | Amano et al. |
| 2008/0250222 A1 * | 10/2008 | Gokhale et al. ............... 711/203 |
| 2008/0320051 A1 | 12/2008 | Murotani et al. |
| 2009/0187776 A1 * | 7/2009 | Baba et al. .................... 713/320 |
| 2009/0300076 A1 | 12/2009 | Friedman et al. |
| 2009/0300641 A1 | 12/2009 | Friedman et al. |
| 2010/0017801 A1 * | 1/2010 | Kundapur ........................ 718/1 |
| 2010/0057881 A1 * | 3/2010 | Corry et al. ................... 709/216 |
| 2010/0153617 A1 * | 6/2010 | Miroshnichenko et al. ...... 711/6 |
| 2010/0250499 A1 | 9/2010 | McAlister et al. |
| 2011/0071983 A1 | 3/2011 | Murase |

\* cited by examiner

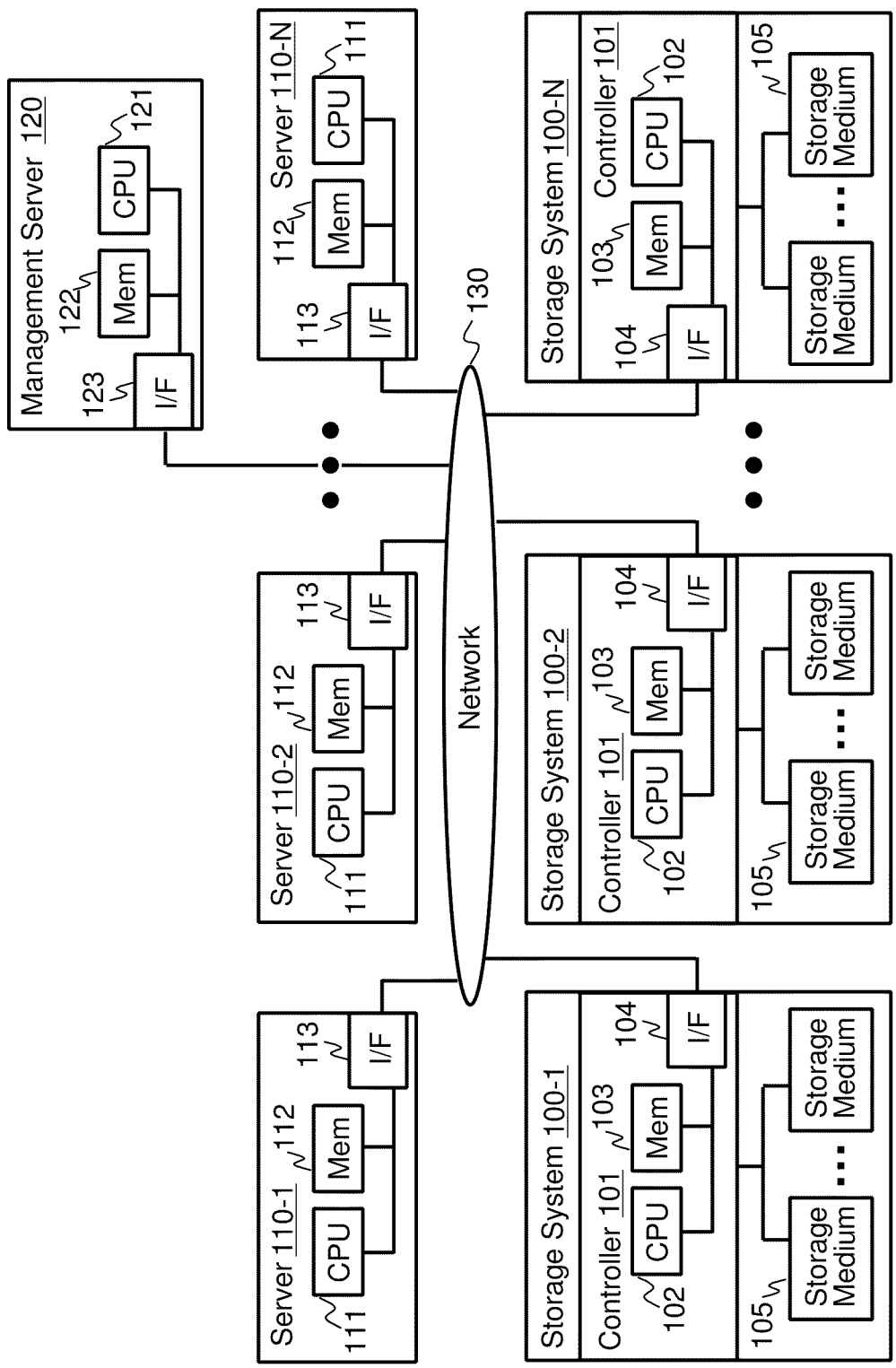
FIG. 1 Hardware Architecture

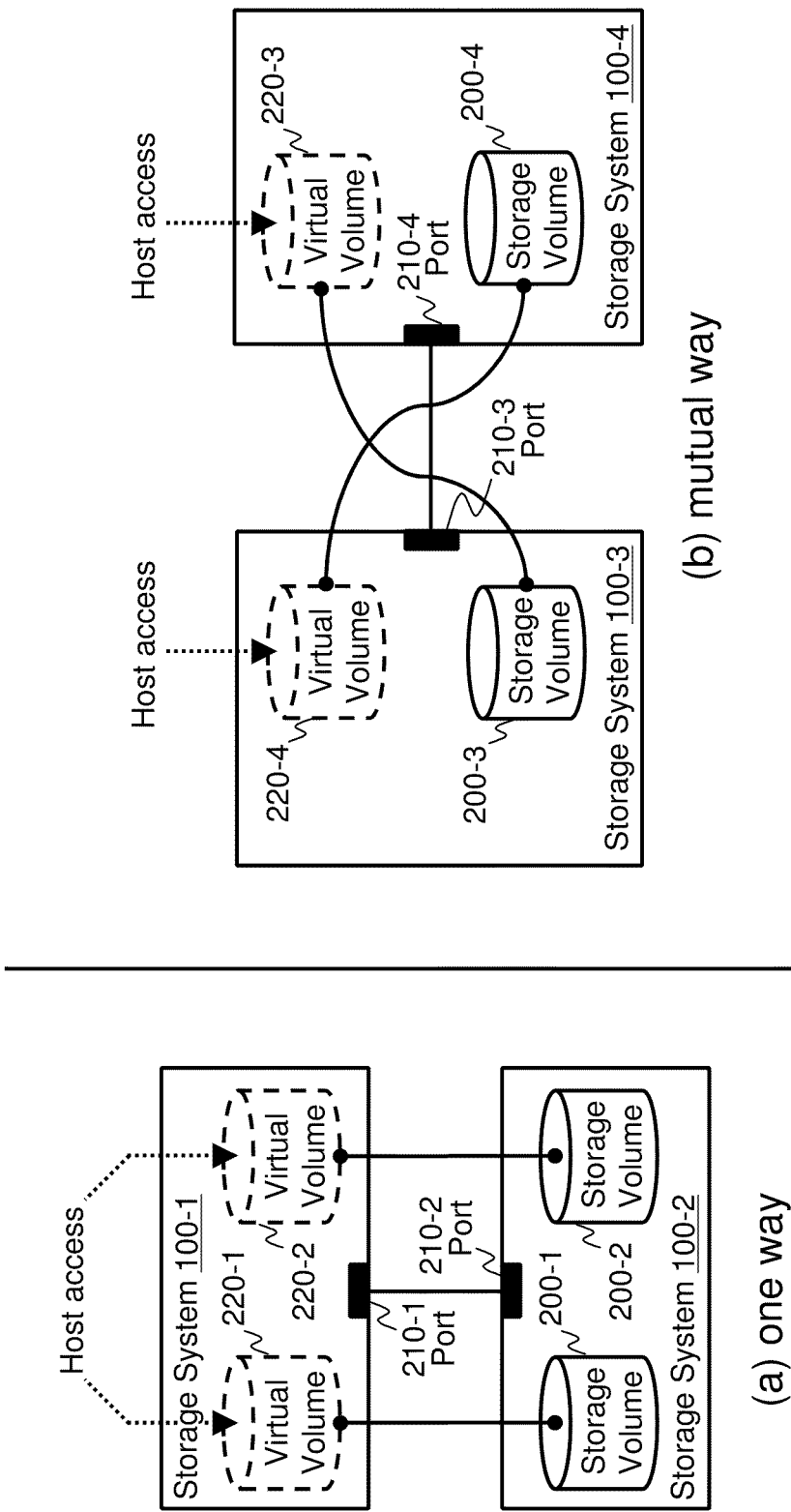
FIG. 2 Logical Element Structure – Volume Location Virtualization

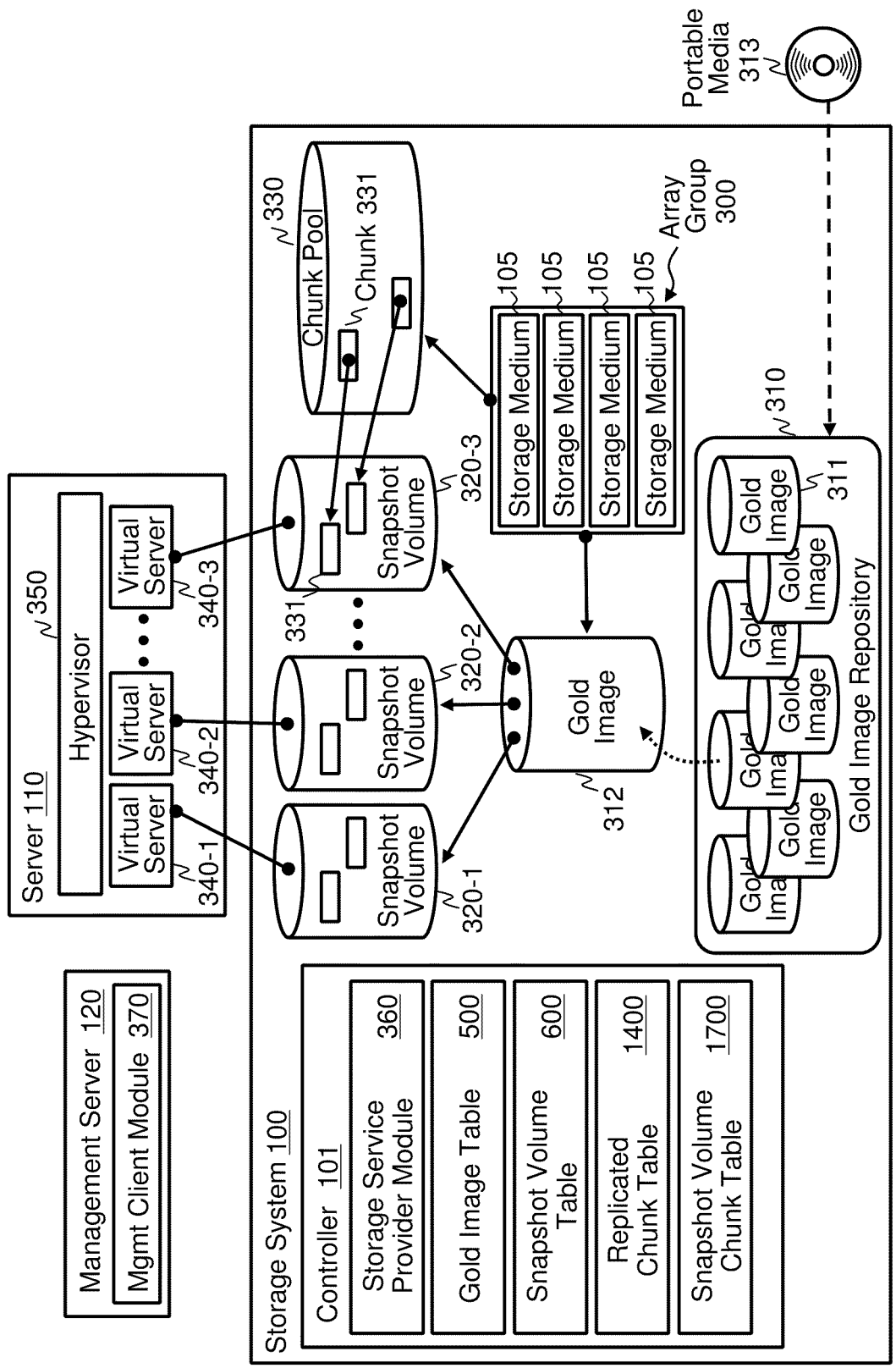
FIG. 3 Logical Element Structure – Snapshot Volume Composition

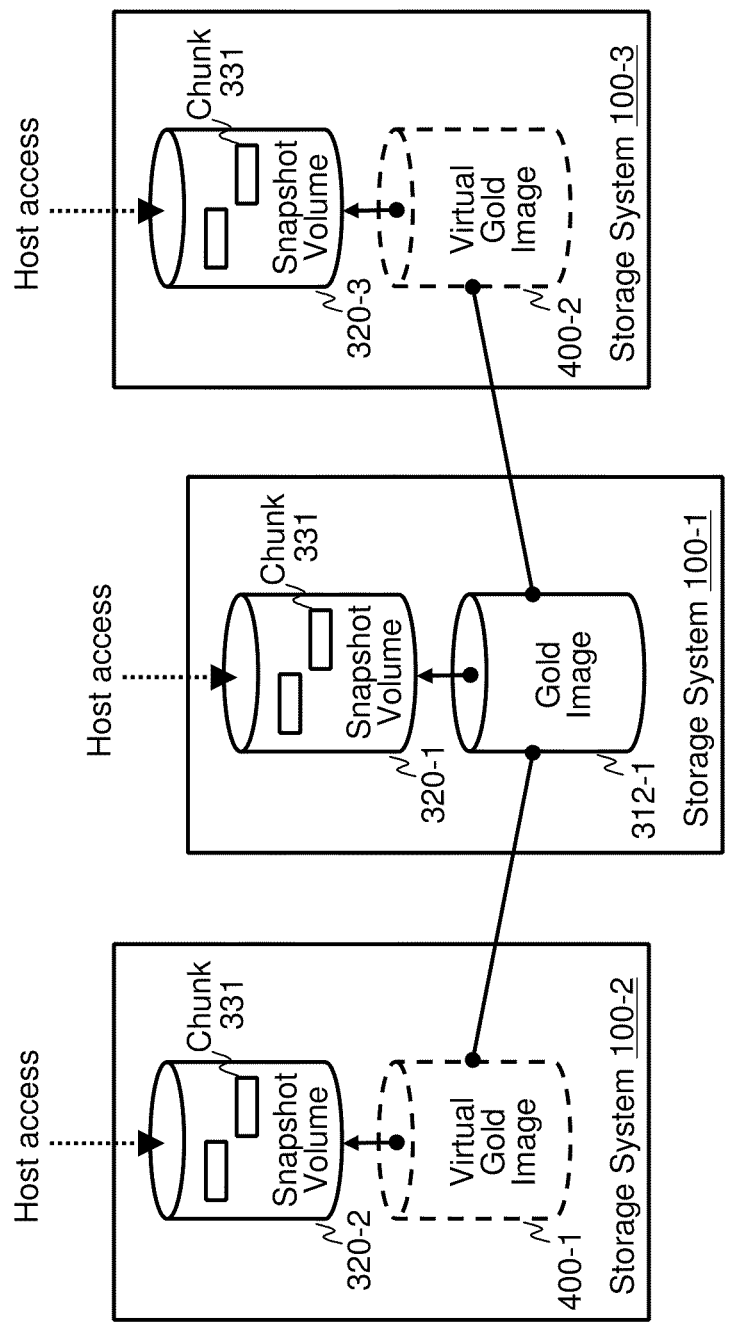
FIG. 4 Logical Element Structure – Gold Image Sharing

| Gold Image ID | Storage Volume ID | Existence | Actual Location | External Storage Volume ID |
|---|---|---|---|---|
| G100 | SV010 | Real | SYS200 | null |
| G200 | SV020 | Virtual | SYS100 | SV050 |
| G300 | SV030 | Real | SYS200 | null |
| ... | ... | ... | ... | ... |

FIG. 5 Data Structure of Gold Image Table

| Snapshot Volume ID | Parent Gold Image ID |
|---|---|
| SV101 | G100 |
| SV102 | G100 |
| SV201 | G200 |
| ... | ... |

FIG. 6 Data Structure of Snapshot Volume Table

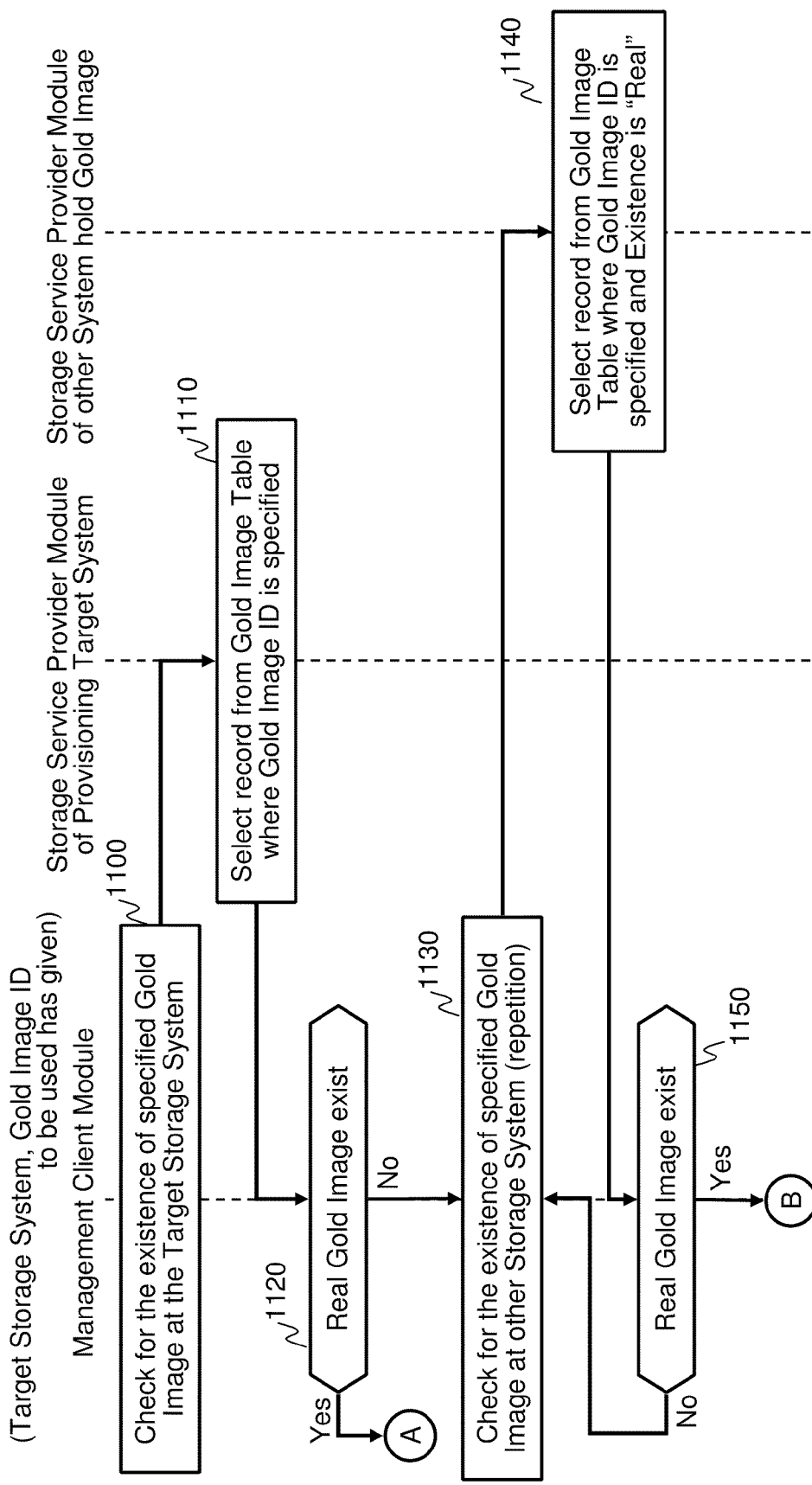
FIG. 7 Process of Server Image Provisioning (a)

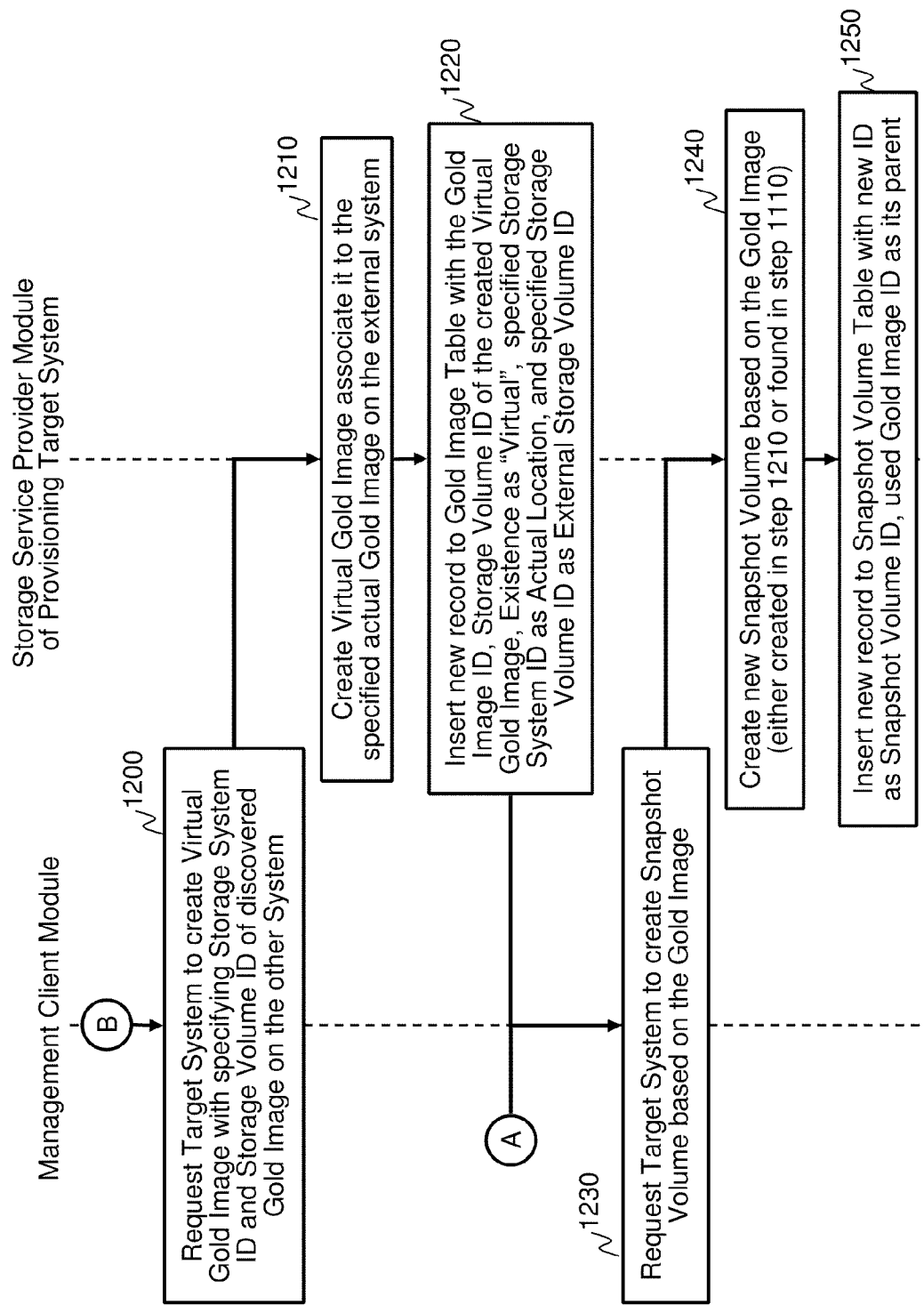
FIG. 8 Process of Server Image Provisioning (b)

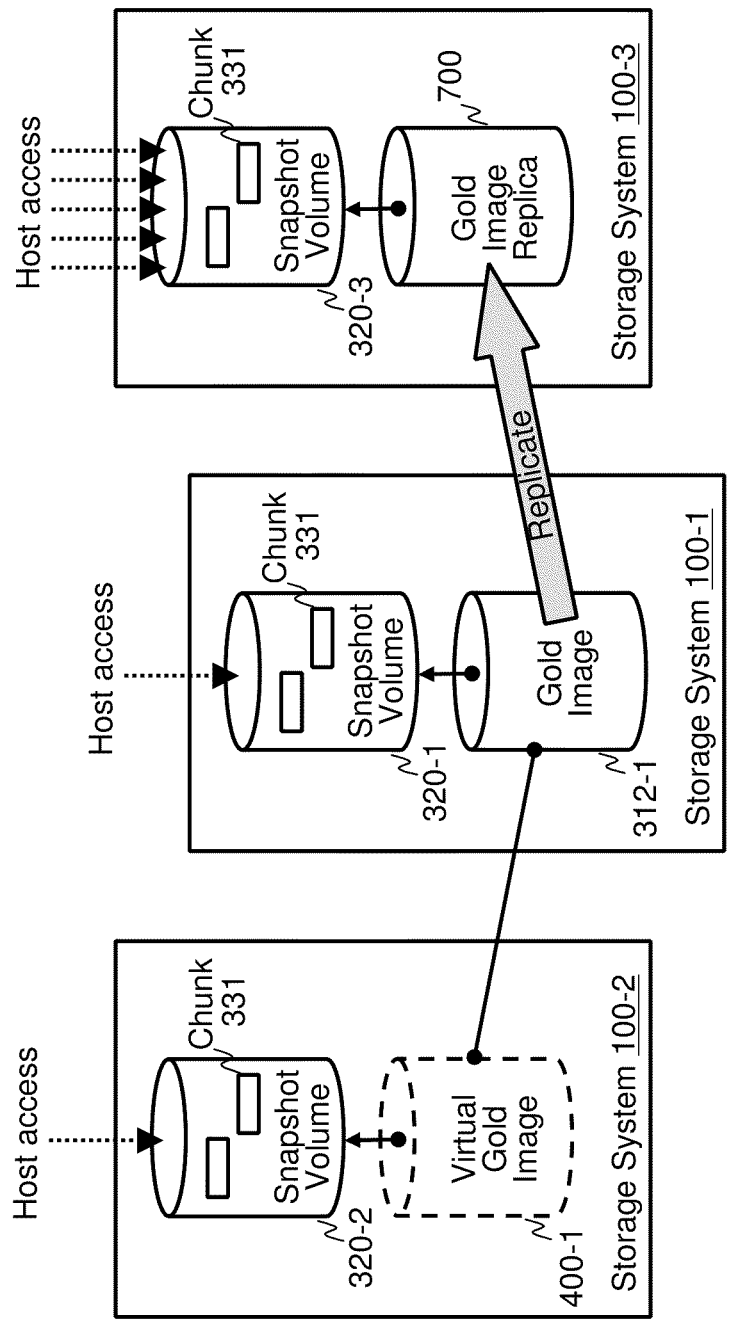
FIG. 9 Logical Element Structure – Gold Image Replication

| Gold Image ID | Storage Volume ID | Existence | Actual Location | External Storage Volume ID | I/O Usage Ratio | Replicated |
|---|---|---|---|---|---|---|
| G100 | SV010 | Real | SYS300 | null | 12% | No |
| G200 | SV020 | Virtual | SYS100 | SV050 | 24% | Yes |
| G300 | SV030 | Virtual | SYS500 | SV080 | 72% | No |
| ... | ... | ... | ... | ... | ... | ... |

FIG. 10 Data Structure of Gold Image Table with Replicated Information

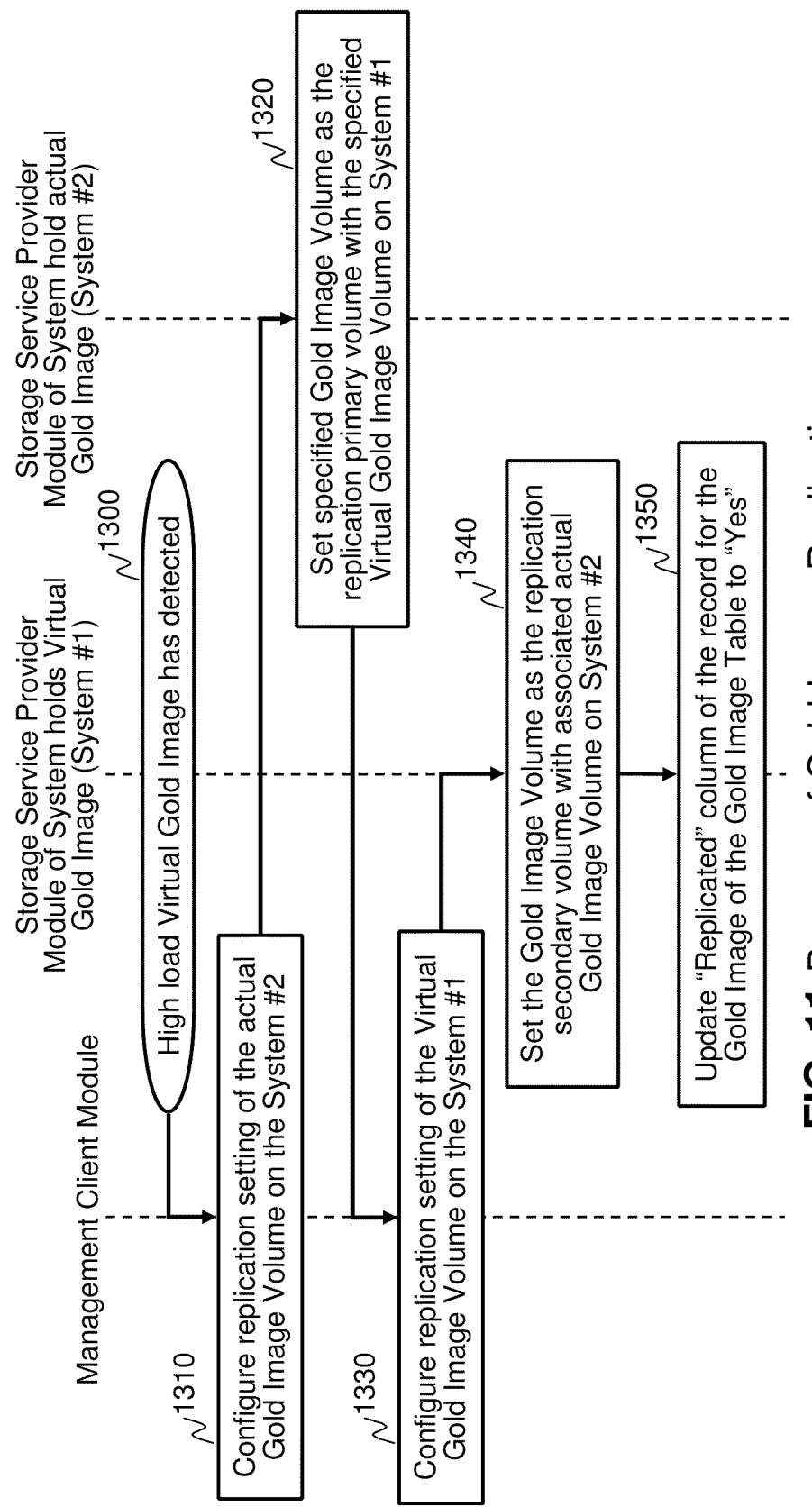
FIG. 11 Process of Gold Image Replication

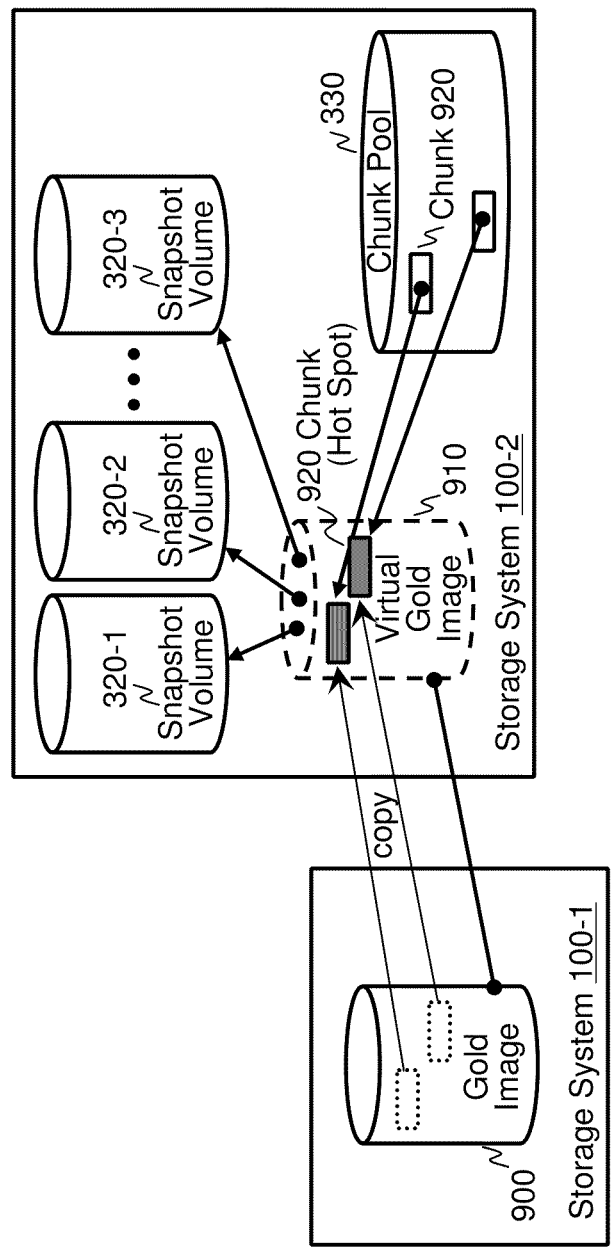
FIG. 12 Logical Element Structure – Gold Image Chunk Replication

| Chunk ID 1410 | Gold Image ID 1420 | Start LBA 1430 | Number of Blocks 1440 |
|---|---|---|---|
| CK001 | G100 | 0 | 32 |
| CK002 | G100 | 32 | 25 |
| CK003 | G101 | 0 | 32 |
| CK004 | G100 | 128 | 32 |
| ... | ... | ... | ... |

1491, 1492, 1493, 1494

1400

FIG. 13 Data Structure of Replicated Chunk Table

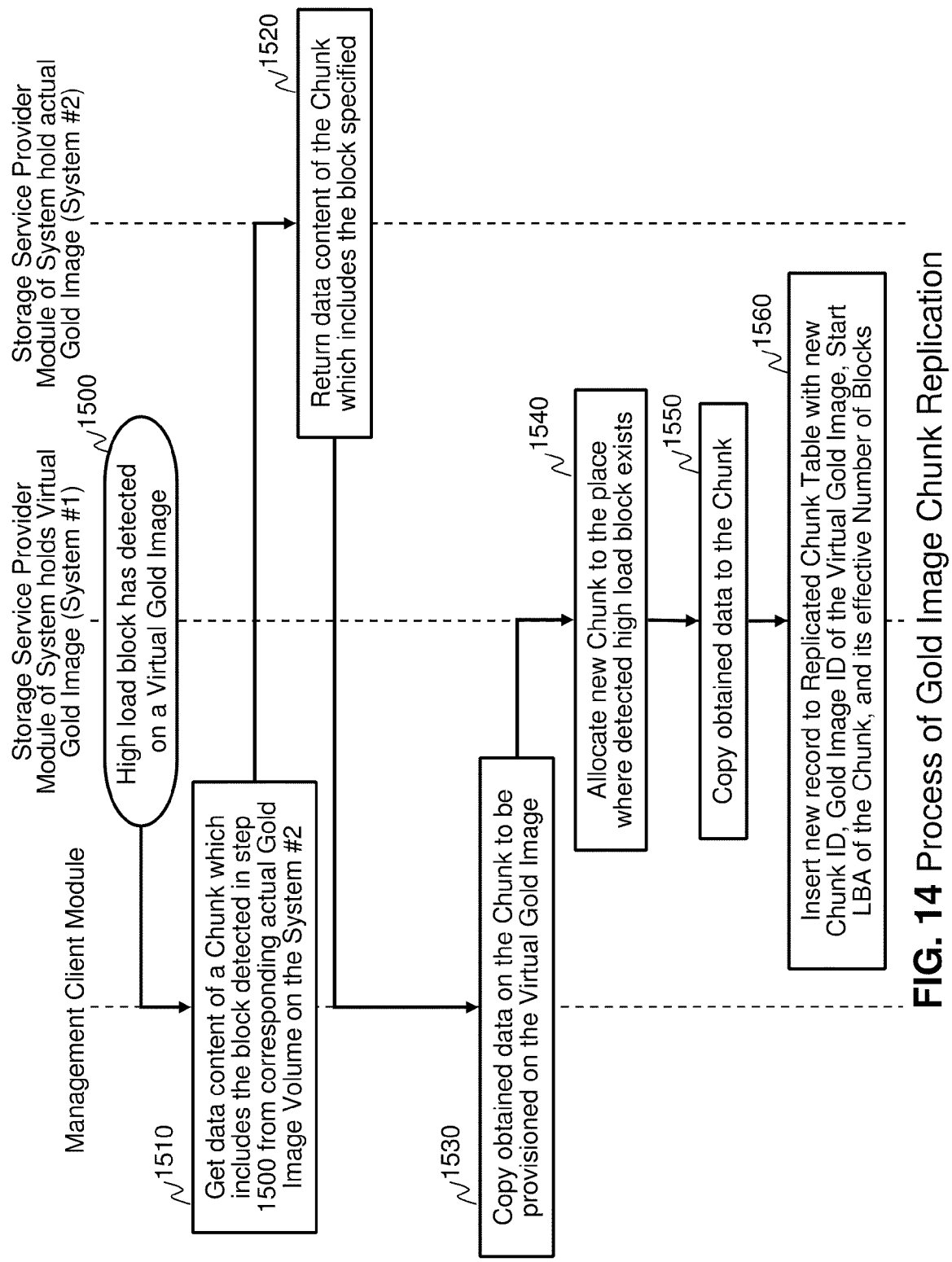
FIG. 14 Process of Gold Image Chunk Replication

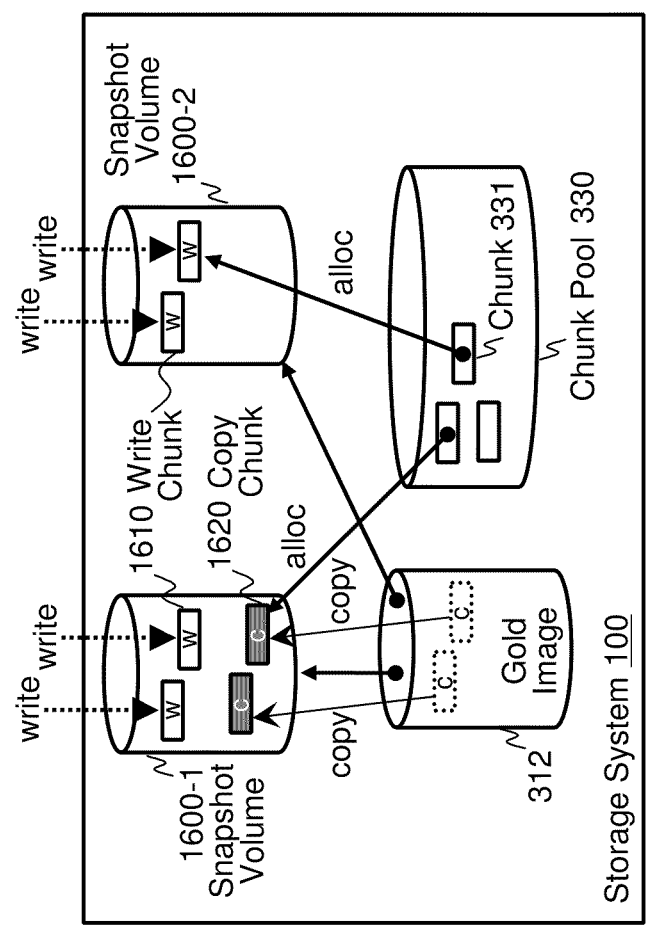
FIG. 15 Logical Element Structure – Gold Image to Snapshot Volume Chunk Replication

| Chunk ID | Snapshot Volume ID | Start LBA | Number of Blocks | Usage |
|---|---|---|---|---|
| CK001 | SV101 | 0 | 32 | overwrite |
| CK002 | SV101 | 32 | 25 | overwrite |
| CK003 | SV102 | 0 | 32 | replica |
| CK004 | SV102 | 128 | 32 | replica |
| ... | ... | ... | ... | ... |

FIG. 16 Data Structure of Snapshot Volume Chunk Table

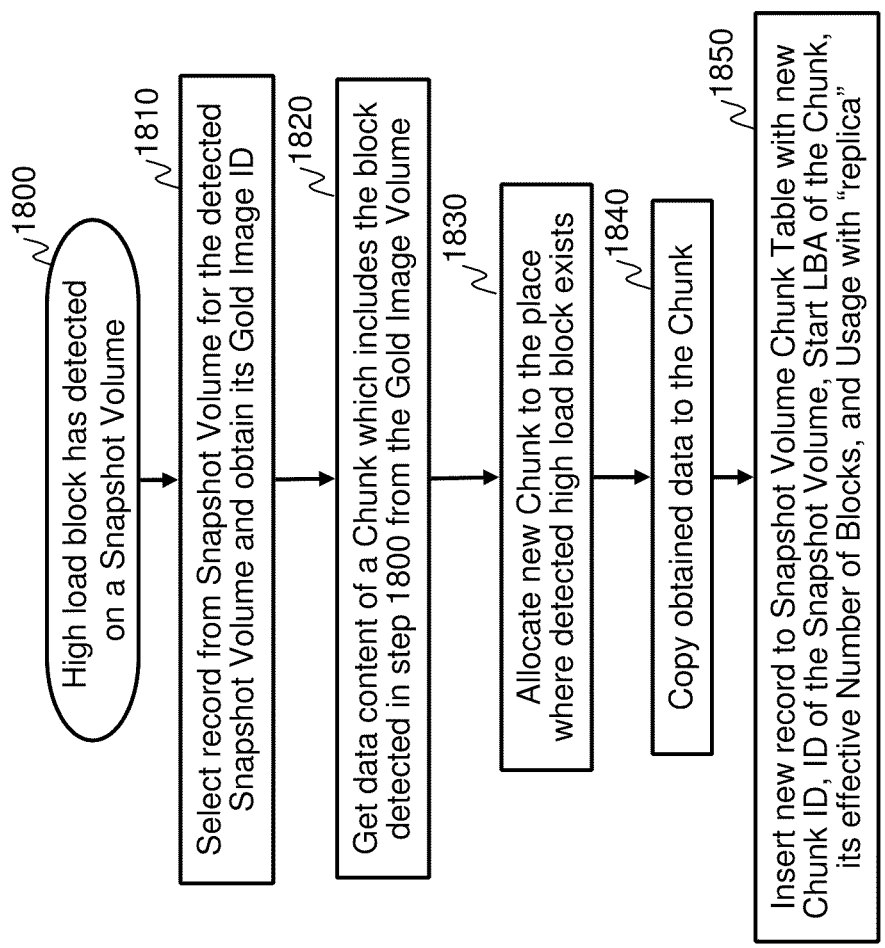
FIG. 17 Process of Gold Image to Snapshot Volume Chunk Replication

SERVER IMAGE CAPACITY OPTIMIZATION

BACKGROUND OF THE INVENTION

The present invention relates generally to storage systems and, more particularly, to server image capacity optimization.

In order to address the rapid growth of digital data size in datacenters, the scale-out type of storage solution has emerged rather than using a large monolithic storage device in order to avoid the inefficiency of the storage. A variety of storage virtualization technologies have enabled plural devices to provide a logically consolidated large size of storage capacity to host servers or users, in accordance with adding physical storage devices or medium such as HDD. Storage devices are interconnected against each others to reference, share, write, or copy data mutually. Examples of the volume location virtualization technology can be found in U.S. Pat. Nos. 6,098,129 and 7,051,121.

Rapid penetration of virtual server deployment in enterprise datacenters is another big trend in the IT world today. Not only the OS (operating system) itself but also Virtual Appliance (which is the coupled program image that is able to deploy on the hypervisor that is composed of OS, middleware, and some objective dedicated application) is becoming a major option of virtual server image provisioning. It is a very easy thing to do since there are virtual appliances marketplaces (e.g., http://www.vmware.com/appliances) and the administrator can just download the program and will be ready to start it just as an appliance.

As more virtual server deployment becomes easier, more virtual server sprawl has been seen recently. In addition, the size of each virtual server image (which means including required middleware and applications) has been rapidly growing due to the enrich functions. As a result of this combination, a datacenter needs to have a storage system of a very large size to hold virtual server images.

To optimize the total size of the virtual server images deployed in a datacenter, writeable snapshot technology has the potential to address the issue. For the use of writeable snapshot technology to reduce the virtual server image capacity, see, e.g., http://www.3par.com/SiteObjects/A7B11BEED3AC16DF15CA5A82011BF265/3PAR-sp-ds-08.1.pdf. Moreover, Fitzgerald disclosed a management technique of virtual server instances in US20080134175 A1. It mentioned having a snapshot-like configuration in the system. Also, it described the virtual server image distribution behavior from the repository to a host. However, Fitzgerald did not teach how to reduce the data copy amount of the image during the provisioning, as disclosed in the present invention.

Because the deployment of a plurality of virtual server images has a very large portion of redundant data due to the fact that they hold the same OS, middleware, and applications, and just a little portion of customized area, a snapshot mechanism works well to eliminate the redundant portion while keeping the presenting of the plurality of virtual server images (virtually). The original image is called the "Gold Image." When a new virtual server instance is needed, a snapshot volume of the Gold Image will be created and associated with the virtual server. The snapshot volume is just a logical volume but the data read access can be done by actual read of the corresponding portion of data on the Gold Image. When a write access comes, it will then allocate a little capacity chunk to the snapshot volume and hold the specific data written, and this is the "customized part" from the original data of the Gold Image. With this virtualization technique only the customized data will be newly allocated and the original data part will not be allocated to the respective virtual server image volume. Thus, the total size of storage will be optimized.

However, although writeable snapshot eliminates redundant data within a single storage device, the optimization cannot be applied between separated devices. As described above, the scale-out type of storage system has emerged as the solution to provide the huge capacity of storage in each datacenter to address the rapid growth of digital data. Therefore, many copies of the same Gold Image need to actually exist as the root of snapshots in respective devices, which again results in having a lot of redundant data from the perspective of the entire datacenter.

BRIEF SUMMARY OF THE INVENTION

Exemplary embodiments of the invention provide a solution to optimize/minimize the total capacity of Gold Image within the entire datacenter which utilizes a scale-out type of storage systems.

A plurality of storage systems are interconnected to form a huge logical capacity. Data in other systems can be read, written, or copied mutually. In this invention, one example of the mutual access of data between systems is the external attached storage technology which is the technique to represent a virtual storage volume on a first system which is associated with the actual storage volume on the different second storage system in the datacenter via a network, and the virtual storage volume will be exposed to a host or a user as if a real storage volume having a certain capacity exists on the first storage system. Each storage system has an on-site Gold Image repository to hold Gold Images that will be used as the base of a snapshot volume during the creation/provisioning of a new virtual server instance. When a management client module of a management server is requested (or triggered by any event) to create a new virtual server image on a specific storage system, it will not copy the whole data of the selected Gold Image but will only create a snapshot volume as the new server image based on the specified Gold Image identifier. When a write access request is directed to the snapshot volume and if no capacity has yet been allocated to the specific address, then a new capacity chunk of a relatively small size will be allocated to the snapshot volume and the requested data will be stored. If the chunk has already been allocated to the address, then the content will be overwritten. Thus, for each snapshot volume, any information that has been customized and its data content will be managed by the storage system. When a read access request is directed to the snapshot volume and if the snapshot volume has customized data for the address, then it responds with the specific content of data; but if the snapshot does not have updated data at the specific address, then data on the Gold Image will be returned.

When a new server image provisioning request is issued to a first system with a specific Gold Image ID but the management client module finds that the first system does not hold the desired Gold Image in the Gold Image repository of that system, then the management client module begins searching for the desired Gold Image from other systems in the datacenter. After finding the desired Gold Image on a second storage system, the management client module creates a virtual storage volume of the virtual Gold Image on the first storage system and associates it with the found Gold Image on the second storage system. Then the snapshot volume will be provisioned on the first storage system based on the virtual Gold Image. By providing the mechanism for automatic search of the desired Gold Image from the other storage systems and automatic configuration of creating a virtual volume associated with the found actual Gold Image, embodiments of the present invention can eliminate the need to store redundant data of the same Gold Images in the datacenter.

An aspect of the present invention is directed to a method of server image provisioning in a system which includes a plurality of storage systems, a plurality of host systems, and a network, each of the storage systems being connected via the network to one of the host systems, respectively, the plurality of storage systems being connected to each other via the network. The method comprises checking whether a gold image exists in a first storage system of the plurality of storage systems, the gold image being one of a real gold image or a virtual gold image; if no gold image exists in the first storage system, searching a remainder of the storage systems until a real gold image is found in a second storage system of the plurality of storage systems; after finding the real gold image in the second storage system, creating a virtual gold image in the first storage system, the virtual gold image in the first storage system being associated with the real gold image in the second storage system; and creating a snapshot volume in the first storage system based on the virtual gold image.

In some embodiments, the method further comprises maintaining a gold image table which includes actual location of one or more gold images, the actual location for a real gold image being location of the real gold image, the actual location for a virtual gold image being location of a real gold image associated with the virtual gold image. Each gold image is identified by a gold image ID in the gold image table. Checking whether a gold image exists in the first storage system comprises selecting a gold image ID of a gold image in the gold image table if the gold image exists in the first storage system. The method further comprises updating the gold image table by inserting a record of the created virtual gold image in the first storage system, the record including a gold image ID of the virtual gold image, a storage volume ID of a storage volume level of the virtual gold image, an existence entry of virtual for the virtual gold image, actual location of the virtual gold image, and an external storage volume ID of a storage volume of the real gold image associated with the virtual gold volume. The method further comprises creating a second virtual gold image in a third storage system of the plurality of storage systems, the second virtual gold image in the third storage system being associated with the real gold image in the second storage system. Each snapshot volume has a snapshot volume ID, and the method further comprises maintaining a snapshot volume table containing the snapshot volume ID of the snapshot volume and a gold image ID of the gold image from which the snapshot volume was created. The method further comprises updating the snapshot volume table by inserting a record of the snapshot volume ID of the created snapshot volume and the gold image ID of the virtual gold image from which the snapshot volume was created.

In specific embodiments, the method further comprises monitoring a workload of the virtual gold image in the first storage system; upon detecting that the workload of the virtual gold image exceeds a preset threshold, configuring replication of the real gold image which is associated with the virtual gold image between the second storage system and the first storage system; and replicating the real gold image from the second storage system to the first storage system as a replicated gold image in the first storage system. The method further comprises maintaining a gold image table which includes actual location of one or more gold images, the actual location for a real gold image being location of the real gold image, the actual location for a virtual gold image being location of a real gold image associated with the virtual gold image. The gold image table further includes an I/O usage ratio which is the workload of the gold image and replication information indicating whether the gold image is a replicated gold image. Configuring replication of the real gold image which is associated with the virtual gold image comprises setting the real gold image as a replication primary volume and setting the virtual gold image as a replication secondary volume. The workload is measured by an I/O usage ratio. The method further comprises monitoring a workload of the real gold image in the second storage system; upon detecting that the workload of the real gold image exceeds a preset threshold, configuring replication of the real gold image between the second storage system and the first storage system; and replicating the real gold image from the second storage system to the first storage system as a replicated gold image in the first storage system.

In some embodiments, the method further comprises monitoring a workload of each block of a plurality of blocks of the virtual gold image in the first storage system; upon detecting that the workload of a block of the virtual gold image exceeds a preset threshold, creating a chunk in the first storage system to allocate data to be copied from the real gold image of the second storage system to the virtual gold image of the first storage system; and copying data, from a chunk in the real gold image containing a block which corresponds to the block detected in the virtual gold image, to the created chunk in the first storage system as a replicated chunk. The method further comprises maintaining a replicated chunk table which includes a chunk ID of the chunk, a gold image ID of the virtual gold image to which the chunk belongs, start block address of the chunk, and number of blocks within the chunk. The method further comprises updating the chunk table by inserting a record of a chunk ID of the created chunk, a gold image ID of the virtual gold image to which the created chunk belongs, start block address of the created chunk, and number of blocks within the created chunk. The method further comprises monitoring a workload of each block of a plurality of blocks of the real gold image in the second storage system; upon detecting that the workload of a block of the real gold image exceeds a preset threshold, creating a chunk in the first storage system to allocate data to be copied from the real gold image of the second storage system to the virtual gold image of the first storage system; and copying data from a chunk in the real gold image containing the detected block to the created chunk in the first storage system as a replicated chunk.

Another aspect of the invention is directed to a method of server image provisioning in a system which includes a plurality of storage systems, a plurality of host systems, and a network, each of the storage systems being connected via the network to one of the host systems, respectively, the plurality of storage systems being connected to each other via the network, the plurality of storage systems including a first storage system which has a real gold image and a snapshot volume created based on the real gold image. The method comprises monitoring a workload of each block of a plurality of blocks of the snapshot volume in the first storage system; upon detecting that the workload of a block of the snapshot volume exceeds a preset threshold, creating a chunk in the snapshot volume to allocate data to be copied from the real gold image; and copying data, from a chunk in the real gold image containing a block which corresponds to the detected block in the snapshot volume, to the created chunk in the snapshot volume as a replicated chunk.

In specific embodiments, the method further comprises maintaining a snapshot volume chunk table which includes a chunk ID of the chunk, a snapshot volume ID of the snapshot volume to which the chunk belongs, start block address of the chunk, number of blocks within the chunk, and usage information indicating whether data is overwritten as writeable snapshot in the chunk or allocated as replicated data in the chunk.

In accordance with another aspect of the invention, a server image provisioning system comprises a plurality of storage systems; a plurality of host systems; a network, each of the storage systems being connected via the network to one of the host systems, respectively, the plurality of storage systems being connected to each other via the network; and a management computer connected to the network. The management computer checks whether a gold image exists in a first storage system of the plurality of storage systems, the gold image being one of a real gold image or a virtual gold image. If no gold image exists in the first storage system, the management computer searches a remainder of the storage systems until a real gold image is found in a second storage system of the plurality of storage systems. After the real gold image in the second storage system is found, the first storage system creates a virtual gold image in the first storage system, the virtual gold image in the first storage system being associated with the real gold image in the second storage system. The first storage system creates a snapshot volume in the first storage system based on the virtual gold image.

In some embodiments, the first storage system monitors a workload of each block of a plurality of blocks of the virtual gold image in the first storage system. Upon detecting that the workload of a block of the virtual gold image exceeds a preset threshold, the first storage system creates a chunk in the first storage system to allocate data to be copied from the real gold image of the second storage system to the virtual gold image of the first storage system. The first storage system copies data, from a chunk in the real gold image containing a block which corresponds to the block detected in the virtual gold image, to the created chunk in the first storage system as a replicated chunk.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of a system in which the method and apparatus of the invention may be applied.

FIG. 2 illustrates an example of a logical element structure of storage volume location virtualization.

FIG. 3 shows an example of a logical element structure of snapshot volume composition and software.

FIG. 4 shows an example of a logical element structure of sharing Gold Image on different storage systems.

FIG. 5 illustrates an exemplary data structure of a Gold Image table.

FIG. 6 illustrates an exemplary data structure of a snapshot volume table.

FIGS. 7-8 illustrate an example of a flow diagram of a process for provisioning a new virtual server image by creating a snapshot volume from the Gold Image according to the first embodiment.

FIG. 9 illustrates an example of a logical element structure of Gold Image replication of the second embodiment.

FIG. 10 shows an exemplary data structure of a Gold Image table according to the second embodiment.

FIG. 11 shows an example of a flow diagram of a process for Gold Image replication.

FIG. 12 shows an example of a logical element structure of Gold Image chunk replication according to the third embodiment.

FIG. 13 shows an exemplary data structure of a replicated chunk table.

FIG. 14 shows an example of a flow diagram of a process for Gold Image chunk replication.

FIG. 15 shows an example of a logical element structure of Gold Image to snapshot volume chunk replication according to the fourth embodiment.

FIG. 16 shows an exemplary data structure of a snapshot volume chunk table.

FIG. 17 shows an example of a flow diagram of a process for snapshot volume chunk replication.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for server image capacity optimization.

First Embodiment

1. Hardware Architecture

FIG. 1 illustrates an example of a hardware configuration of a system in which the method and apparatus of the invention may be applied. The IT system in this example includes a plurality of servers 110 (110-1 to 110-N) and a plurality of storage systems 100 (100-1 to 100-N) connected with a network 130. The servers logically provide a large computing resource pool and, similarly, the storage systems provide a huge logical storage resource pool. Either of the two resources can be deployed by the size needed independently of the boundary of each physical device. A management server 120 controls the entire IT resource management.

Each storage system 100 includes a controller 101 and a plurality of storage mediums 105. The controller includes a CPU 102, a memory 103, and a network interface 104. The storage mediums 105 are connected to the controller 101 and can be various types of devices such as hard disk, flash memory, optical disk, and so on. The servers 110 are generic computers that each include a CPU 111, a memory 112, and a network interface 113. The management server 120 is a generic computer that includes a CPU 121, a memory 122, and a network interface 123. It is a terminal for the end user to operate IT resource management.

2. Logical Element Structure

1) Volume Location Virtualization

FIG. 2 illustrates an example of a logical element structure of storage volume location virtualization of this embodiment. FIG. 2(a) shows a one way configuration in which two storage systems 100-1 and 100-2 are interconnected by a network (either directly or via a switch device) through their ports 210-1, 210-2. The storage volumes 200 on the storage system 100-2 are normal storage volumes which have real capacity of storage. The virtual volumes 220 on the storage system 100-1 are virtual storage volumes that do not hold any actual bit of content data but exist on the storage system 100-1 as if actual storage volumes were present on that system. Each virtual volume is associated with a specific actual storage volume (e.g., virtual volume 220-1 associated with actual volume 200-1), and provides data read/write service to the data content in the associated actual storage volume. Therefore, by this technology, actual data location is virtualized.

FIG. 2(b) shows a mutual way configuration in which two storage systems 100-3 and 100-4 are interconnected. In this example, the virtual volume and storage volume association has been configured mutually across the two systems. In other words, the association directions are configured in a mutual way between the two systems. For instance, the virtual volume 220-3 on the storage system 100-4 is associated with the storage volume 200-3 on the storage system 100-3, while at the same time the virtual volume 220-4 which is on the same system as the storage volume 200-3 is associated with the storage volume 200-4 on the storage system 100-4. It is understood that this mutual way association can be applied to any two storage systems (100-1 to 100-N) in the datacenter of FIG. 1. Furthermore, the interconnection can be set logically by connecting physically via a switch device.

2) Snapshot Volume Composition

FIG. 3 shows an example of a logical element structure of snapshot volume composition and software of this embodiment.

2a) Virtual Servers on Server

The physical servers 110 each have a hypervisor 350 which can logically produce and perform virtualized server instance for virtual servers 340. A single physical server 110 or hypervisor 350 on that server can generate and control a plurality of virtual servers (340-1, 340-2, etc.) at a time. Physical resources such as CPU, memory, and network interface are shared (or partitioned) among the plurality of virtual servers 340. Each virtual server 340 can execute applications respectively and independently as if each virtual server 240 were running standalone.

2b) Storage Volume Composition

An array group 300 is the logical capacity which is comprised of a plurality of storage mediums 105 to form a RAID group. For example, it may be composed as RAID 5 with 3 disks of data and 1 parity disk. A Gold Image 312 or a chunk pool 330 is a storage volume which is another logical capacity that is carved from the array group 300.

2c) Gold Image Repository

An on-site Gold Image repository 310 is the container of Gold Images 211. Each Gold Image is an object-dedicated package having an OS, a middleware, and an application. When provisioning a new virtual server instance on the hypervisor 350, the Gold Image 312 will be used as a template of the virtual server image. The on-site Gold Image repository 310 holds a plurality of Gold Images 311 that the storage system 100 will use, such as an E-mail Gold Image having Windows 2008 and Exchange Server, for instance. A new Gold Image can be installed from a portable media 313. In FIG. 3, one of the Gold Image 311 is drawn on top of the Gold Image repository 310 in a separate icon as Gold Image 312 for the purpose of description of the storage volume composition, but that is identical to the Gold Image inside the repository.

2d) Gold Image and Snapshot Volume

As described above, the virtual server image that each respective virtual server 340 uses is created based upon the Gold Image 312. In FIG. 3, all snapshot volumes 320 (320-1, 320-2, etc.) are virtual server images that are created by making snapshots of the Gold Image 312. The snapshot volumes 320 originally have no capacity at first but are each just a logical storage volume which is related to the specific Gold Image 312. Each snapshot volume 320 (320-1, 320-2, etc.) will be associated with the respective virtual server 340 (340-1, 340-2, etc.) on the physical server 110. Once a read access reaches a snapshot volume 320-1, for instance, it then reads data from the corresponding part of the Gold Image 312. In the same manner, every read access to all snapshot volumes is processed by reading the data from the Gold Image 312. Therefore, the Gold Image data is shared by the snapshot volumes, and thus the total capacity will be reduced.

2e) Data Write to Snapshot Volume

In this invention, the snapshot volumes 340 are not read-only volumes but are customizable independently. Thus, the snapshot function used here is called writeable snapshot. When a write request reaches a snapshot volume 320, it will carve a new chunk 331 from the chunk pool 330 and allocate the new chunk 331 to the snapshot volume 320 to write the requested data. The chunk pool capacity is shared by the snapshot volumes 320. If a read request reaches the address where the snapshot volume 320 has a chunk 331 to hold its specific data, it will be read from the chunk 331 and not from the original Gold Image 312. By utilizing the writeable snapshot feature, the storage system 100 can hold respective customized data for each virtual server image while it can share most of the common data by using the Gold Image 312. Hence it will maintain the high efficiency of capacity use.

2f) Management Client Module

The management server 120 has a management client module 370 which is the user interface to control the entire IT resource operation including virtual server image provisioning. It will orchestrate the storage service provider module 360 on the storage system 100 to perform capacity optimized server image provisioning of the present invention.

2g) Software on the Storage System Controller

The storage system controller 101 includes a storage service provider module 360, a Gold Image table 500, a snapshot volume table 600, a replicated chunk table 1400, and a snapshot volume chunk table 1700. The storage service provider module 360 executes virtual server image provisioning (snapshot from Gold Image) in the storage system 100. The Gold Image table 500 holds records information for the Gold Images 311 stored in the on-site Gold Image repository 310. The snapshot volume table 600 holds records information for the snapshot volumes 320 such as which Gold Image is the parent of a snapshot, and each snapshot is assigned a virtual WWN (world wide name). The replicated chunk table 1400, as will be described in a later embodiment, holds records information for chunks that have been replicated between the virtual Gold Image and the associated actual Gold Image on the different storage systems. The snapshot volume chunk table 1700, as will also be described in a later embodiment, holds records information for chunks 331 that contain overwrite (customized portion) data, and also chunks 331 that are replicated between the Gold Image and the snapshot volume.

3) Gold Image Sharing

FIG. 4 shows an example of a logical element structure of sharing Gold Image on different storage systems of this embodiment. As seen in FIG. 2, a virtual volume can be created and associated with an actual storage volume that exists on a different storage system from the storage system on which the virtual volume is created. In embodiments of this invention, the volume location virtualization technique is used between Gold Images of the storage systems.

In FIG. 4, the storage system 100-1 holds the Gold Image 312-1 and the snapshot volume 320-1 has been snapshot based on the Gold Image. The host read access to the snapshot volume 320-1 will be forwarded to the Gold Image 312-1 at the address where the chunk is not allocated on the snapshot volume. The virtual Gold Image 400-1 on the storage system 100-2 is a virtual volume as described in connection with FIG. 2, which is associated with the Gold Image 312-1 on the storage system 100-1. By having this configuration, the content of the Gold Image can be read from the storage system 100-2. Therefore, the virtual Gold Image 400-1 can be used as one of the Gold Images in the Storage System 100-2, and thus the snapshot volume 320-2 is snapshot based on that virtual Gold Image 400-1. The host read access to the snapshot volume 320-2 will be forwarded to the Gold Image 312-1 on the storage system 100-1. Similarly, the virtual Gold Image 400-2 on the storage system 100-3 is also a virtual volume that is associated with the Gold Image 312-1 on the storage system 100-1, and the snapshot volume 320-3 can be snapshot based on the virtual Gold Image 400-2 in the same manner.

FIG. 4 shows that by using the method according to this embodiment of the invention, a Gold Image will be shared among a plurality of storage systems in the datacenter. Therefore, from the entire datacenter point of view, the total capacity to store Gold Image content data will be optimized. The process to construct this configuration in accordance with the request of new server image provisioning will be described below.

4. Data Structure

1) Gold Image Table

FIG. 5 illustrates an exemplary data structure of the Gold Image table 500 according to the first embodiment. The Gold Image table 500 holds information of each Gold Image 311 that is stored in the on-site Gold Image repository 310, including Gold Image ID 510, storage volume ID 520, existence 530, actual location 540, and external storage volume ID 550. The Gold Image ID 510 is an identifier of the Gold Image 211. The storage volume ID 520 identifies the storage volume (such as LUN). It is used when referring to the actual Gold Image volume from the virtual Gold Image volume. The existence 530 indicates whether it is a real Gold Image in which actual data content is stored on this storage system, or it is a virtual Gold Image for which the actual data content is stored somewhere else. The actual location 540 identifies the storage system in which the actual content data is stored; hence if it is virtual then the ID of the external storage system is recorded. The external storage volume ID identifies the storage volume of the actual Gold Image volume, in the case where the Gold Image is virtual.

For instance, row 591 of the Gold Image table 500 shows that the Gold Image having the Gold Image ID "G100" has "SV010" as its storage volume ID, it is a "Real" volume which has data content in the volume, and thus the actual location "SYS200" is the storage system ID of that device itself (external storage volume ID is "null" for a real Gold Image volume case). On the other hand, row 592 shows an example of a virtual Gold Image indicated by the "Virtual" entry in the existence column 530. The actual location 540 is the storage system ID where the associated actual Gold Image is stored, and the external storage volume ID "SV050" shows the storage volume ID of the Gold Image at the external storage system. When the storage system imports Gold Image data from the portable media 313, it will create a new record of this table in accordance with storing the Gold Image data to the Gold Image repository. More importantly in this invention, when the virtual Gold Image is created by associating with the actual Gold Image on a different storage system, a new record of this table will be added by the storage service provider module of the storage system where the virtual Gold Image has been created.

2) Snapshot Volume Table

Figure 6:
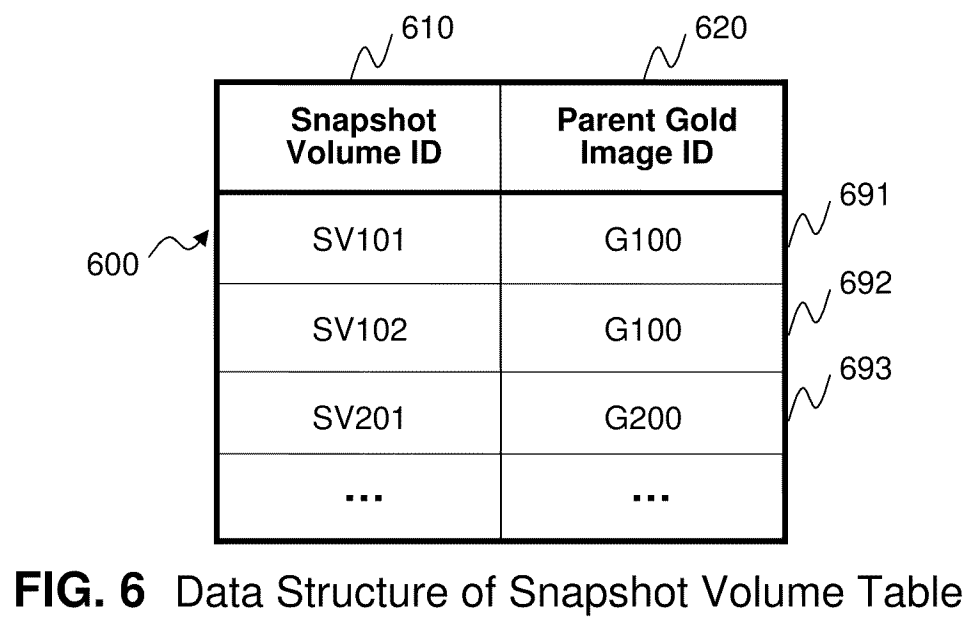

FIG. 6 illustrates an exemplary data structure of the snapshot volume table 600 according to the first embodiment. The snapshot volume table 600 holds information of each snapshot volume 320 that was created based upon a Gold Image 311, including snapshot volume ID 610 and parent Gold Image ID 620. The snapshot volume ID 610 is an identifier of the snapshot volume 320. The parent Gold Image ID 620 is an identifier of the Gold Image that is associated with the snapshot volume 320. For instance, row 691 shows that the snapshot volume "SV101" was a snapshot from a Gold Image "G100," and row 692 shows that the snapshot volume "SV102" was a snapshot from the same Gold Image "G100" while row 693 shows that the snapshot volume "SV201" was a snapshot from a different Gold Image "G200." Records are created when the storage service provider module 360 executes a new snapshot action (i.e., provisioning new virtual server image).

4. Process Flow of Virtual Server Image Provisioning

FIGS. 7-8 illustrate an example of a flow diagram of a process for provisioning a new virtual server image by creating a snapshot volume 320 from the Gold Image 312 according to the first embodiment. If the desired Gold Image already exists on the specific storage system of the provisioning, then simply a new snapshot volume 320 from the Gold Image 312 will be created; else if the desired Gold Image does not exist, the program searches the desired Gold Image at first and constructs the virtual volume to actual Gold Image volume association between the provisioning target storage system and the storage system where the actual Gold Image 312 is found, and then the new snapshot volume 320 will be created based on the created virtual Gold Image 400. This process is performed by the management client module 370 in combination with the storage service provider module 360 on each storage system involved. It is assumed that the target storage system to provision the new server image and the target Gold Image ID have been given before the process starts.

In step 1100, the management client module 370 checks for the existence of the specified Gold Image at the target storage system. In step 1110, per the request of step 1100, the storage service provider module 360 on the provisioning target storage system checks for the existence of the Gold Image, by selecting the record from its Gold Image table 500 where the Gold Image ID is the specified ID, and returning the check result. Either real or virtual Gold Image can be used for provisioning. In step 1120, if the provisioning target storage system has the desired Gold Image, then the program proceeds to step 1230 for provisioning of the snapshot volume; otherwise, the program proceeds to step 1130 to search the desired Gold Image from the other storage systems. In step 1130, the management client module 370 checks every storage system in the datacenter one by one until it finds the actual Gold Image volume in a requested storage system. In step 1140, the requested storage system checks its Gold Image table 500 for the record where the Gold Image ID 510 is the specified ID and the existence 530 is "Real," and returns the result. In step 1150, if the desired Gold Image is found, then the program proceeds to step 1200; otherwise it returns to step 1130 to check the next storage system in the datacenter.

In step 1200, after finding the desired Gold Image, the management client module 370 requests the provisioning target storage system to create a new virtual Gold Image by specifying the storage system ID and storage volume ID of the discovered actual Gold Image on the found storage system. In step 1210, the storage service provider module 360 on the provisioning target storage system then creates the virtual Gold Image associated with the specified actual Gold Image on the other storage system (externally attached storage system). In step 1220, the storage service provider module 360 on the provisioning target storage system inserts a new record into its Gold Image table 500 with the Gold Image ID 510, the storage volume ID 520 of the created virtual Gold Image, the existence 530 as "Virtual," the specified external attached storage system ID as the actual location 540, and the specified storage volume ID of the actual Gold Image as the external storage volume ID 550.

In step 1230, either the provisioning target storage system has the desired Gold Image (in virtual or actual) or the newly created virtual Gold Image, and the management client module 370 then requests the storage system to create the snapshot volume 320 based on the Gold Image. In step 1240, the storage service provider module 360 on the provisioning target storage system creates a new snapshot volume based on the specified Gold Image. In step 1250, the storage service provider module 360 on the provisioning target storage system inserts a new record into its snapshot volume table with a new ID of the snapshot volume which used the Gold Image's ID as parent.

Second Embodiment

By applying method of the first embodiment, the total amount of Gold Images in the datacenter which has many scale-out type storage systems will be dramatically reduced. However, new issues may arise due to the consolidation of access to the actual Gold Images. Once every virtual Gold Image on the plurality of storage systems refers to a single actual Gold Image on an externally attached storage system, every access to the snapshot volumes related to that single Gold Image residing at every storage system will begin to be forwarded to that external storage system, potentially resulting in a performance bottleneck. The second embodiment will address this issue. It monitors the workload of the virtual Gold Images, and if it detects a high workload, then it makes replica of the actual Gold Image, and replaces the virtual Gold Image with the actual Gold Image for the storage system so that the storage system does not use the virtual Gold Image anymore. Having the replica, the access workload on the storage system storing the original actual Gold Image will be relieved. Yet, this process will be carried out only for the portion where too much workload is detected, and the rest of the Gold Images remain consolidated. Therefore, the total capacity of Gold Image is optimized from the view of the total system capacity as well as the required performance. Most of the components and characteristics are the same as those in the first embodiment. The following discussion focuses mainly on the differences.

1. Logical Element Structure

FIG. 9 illustrates an example of a logical element structure of Gold Image replication of the second embodiment. It is assumed that the Gold Image 312-1 was originally shared by the virtual Gold Image 400-1 on the storage system 100-2 and the virtual Gold Image 400-2 on the storage system 100-3 as shown in FIG. 4. However, when the host access to the snapshot volume 320-3 on the storage system 100-3 becomes heavy, the situation is detected as descried below and the data content of the actual Gold Image 312-1 is copied or replicated to the Gold Image replica 700 on the storage system 100-3. After completion of the replication, the host access to the snapshot volume 320-3 will be forwarded only to the Gold Image replica 700 and will not be further forwarded to the Gold Image 312-1, thereby relieving the workload of the Gold Image 312-1.

2. Data Structure—Gold Image Table

FIG. 10 shows an exemplary data structure of the Gold Image table 800 according to the second embodiment. This table 800 includes two additional columns for I/O usage ratio 860 and replicated 870 as compared to the Gold Image table 500 of FIG. 5 of the first embodiment. The I/O usage ratio 860 is the access performance statistics data which shows how busy the actual or virtual Gold Image is. The replicated column 870 indicates whether the virtual Gold Image has been replicated. For instance, row 892 shows that the virtual Gold Image "G200" had a workload above the threshold before and it has been replicated as indicated by the "Yes" entry on the replicated column 870, and now its I/O usage ratio 860 is only "24%." In the example, the existence 530 remains "Virtual" even after it has been replicated, because it is a "replica" of the original Gold Image associated therewith. This avoids the confusion of having a plurality of real Gold Images having the same ID in the plurality of storage systems; keeping the "Virtual" entry for the existence column 530 retains the relationship with the original Gold Image. It is noted that row 893 shows another virtual Gold Image "G300" is having a high I/O usage ratio 860 of "72%" and may be detected as being a candidate for the replication process soon.

3. Process Flow—Gold Image Replication

FIG. 11 shows an example of a flow diagram of a process for Gold Image replication when the I/O usage ratio of a specific virtual Gold Image has been detected to be too high above a given threshold. The storage service provider module 360 of each storage system 100 monitors the respective virtual Gold Image I/O usage ratio 860 and, if it gets too high, the module 360 reports the result to the management client module 370. The management client module 370 then configures the replication setting between the original actual Gold Image and the virtual Gold Image.

In step 1300, the storage service provider module 360 of a storage system detects the high workload of the virtual Gold Image and reports it to the management client module 370 with the information of the associated original Gold Image information such as its storage system ID or storage volume ID 520. In step 1310, the management client module 370 sends a command to the storage service provider module of the storage system where the original Gold Image resides to set the original Gold Image as the replication primary (source) volume associated with the virtual Gold Image for which the high workload has been detected. In step 1320, the storage service provider module of the storage system which has the original Gold image sets the volume as the replication primary volume. In step 1330, the management client module 370 sends a command to the storage service provider module of the storage system which holds the detected virtual Gold Image to set that as the replication secondary (destination) volume of the original Gold Image (replication primary volume). In step 1340, the storage service provider module which receives the command sets the virtual Gold Image as the replication secondary volume. In step 1350, the same storage service provider module updates the replicated column 870 of the record for the virtual Gold Image of its Gold Image Table 800 to "Yes."

Similar to the process described above, replication setting can be triggered by the I/O usage ratio of a shared Gold Image in an alternative method. When the storage service provider module of the storage system which shares a Gold Image with other storage system(s) detects that the access is too high to the Gold Image, the management client module 370 can set the replication setting from the storage system to all or some of the virtual Gold Image(s) on other storage system(s) sharing the Gold Image. The process for this alternative is reputation of the process described above (i.e., it will repeat the replication configuration process described above between the real Gold Image and each replica volume (virtual Gold Image)).

Third Embodiment

Similar to the second embodiment but finer granular replication can be applied only for the hot spot portion of the virtual Gold Image by utilizing the chunk level of operation rather than volume level of replication, so that it can be more capacity optimized than the method of the second embodiment. Most of the components and behaviors are the same as those shown in the previous embodiments. The following discussion focuses mainly on the differences.

1. Logical Element Structure

FIG. 12 shows an example of a logical element structure of Gold Image chunk replication according to the third embodiment. In this embodiment, the workload will be monitored by not only the storage volume level but in block level to find out the specific hot spot within the virtual Gold Image. For example, when the storage service provider module 360 on the storage system 100-2 detects the hot spot block of the virtual Gold Image 910, it will report to the management client module 370. It then operates the data copy of only the portion of hot spot from original Gold Image 900 to the virtual Gold Image 910 by carving a new chunk 920 from the chunk pool 330 where it corresponds to the hot spot block detected.

2. Data Structure—Replicated Chunk Table

FIG. 13 shows an exemplary data structure of a replicated chunk table 1400. It holds information of each chunk that is allocated to replicate the original Gold Image to the virtual Gold Image. The chunk ID 1410 identifies the chunk. The Gold Image ID 1420 is an identifier of the virtual Gold Image to which the chunk belongs. The start LBA 1430 is the LBA on the virtual Gold Volume which shows start address of the chunk. The number of blocks 1440 is the number of valid blocks within the chunk. For instance, row 1491 represents a record of a chunk which has "CK001" as the ID, which belongs to the virtual Gold Image "G100", and which is stored from LBA "0" with the valid "32" blocks from the beginning. During the allocation of chunks to the specific size of data, it will be broken down to chunks with its maximum size of blocks (e.g., 32 blocks). The end portion might not fit this boundary; thus it will often be less in length than the maximum blocks in a chunk. For instance, the number of blocks 1440 of row 1492 shows it has only 25 blocks of valid data within the chunk.

3. Process Flow—Gold Image Chunk Replication

FIG. 14 shows an example of a flow diagram of a process for Gold Image chunk replication when too high an I/O usage ratio of a specific block of virtual Gold Image was detected. Each storage system's storage service provider module 360 monitors for the respective virtual Gold Image I/O usage ratio by block granularity and, if the ratio gets too high, it reports that to the management client module 370, and then the management client module 370 copies the corresponding portion of data from the original Gold Image to the virtual Gold Image by chunk size of boundary.

In step 1500, the storage service provider module 360 of a storage system detects the high workload block of a virtual Gold Image and reports it to the management client module 370 with the information of the associated original Gold Image information such as its storage system ID or storage volume ID 520, and hot spot address. In step 1510, the management client module 370 requests the storage service provider module 360 on the storage system which has the specified original Gold Image to retrieve content data of the specified address by the boundary of chunk size. In step 1520, the storage service provider module which has original Gold Image returns the data content of the specified portion. In step 1530, the management client module 370 then sends a command to the storage service provider module of the storage system which holds the detected virtual Gold Image to store the obtained data content to the portion of the detected virtual Gold Image.

In step 1540, the storage service provider module allocates a new chunk to the place where the detected high workload block exists. In step 1550, it copies the obtained data from the management client module to the chunk. In step 1560, it inserts a new record to its replicated chunk table 1400 with the new chunk ID 1410, Gold Image ID 1420 of the belonging virtual Gold Image, start LBA 1430, and number of blocks 1440 of the allocated chunk.

Fourth Embodiment

The volume and chunk replication methods described in the second and third embodiments, respectively, were about the replication between the original Gold Image and the associated virtual Gold Image. In the fourth embodiment, a similar technique to the third embodiment between the snapshot volume and its Gold Image to relieve the performance bottleneck is described. Most of the components and behaviors are the same as those shown in previous embodiments. The following discussion will focus mainly on the differences.

1. Logical Element Structure

FIG. 15 shows an example of a logical element structure of Gold Image to snapshot volume chunk replication according to the fourth embodiment. In this embodiment, the storage service provider module 360 monitors the workload of each snapshot volume. For example, when the storage service provider module 360 on the storage system 100 detects the hot spot block of the snapshot volume 1600-1, it operates the data copy of only the portion of the hot spot from the Gold Image 312 to the snapshot volume 1600-1 by carving a new chunk 1620 from the chunk pool 330 where it corresponds to the hot spot block detected. As a result, the snapshot volumes may have both types of chunks: one is the write chunk 1610 which is to hold overwrite (customized) data uniquely to the snapshot volume from the shared Gold Image; another is the copy chunk 1620 just describe above.

2. Data Structure—Snapshot Volume Chunk Table

FIG. 16 shows an exemplary data structure of a snapshot volume chunk table 1700. It holds information of each chunk that is allocated to the snapshot volumes with information of whether it is a replica of a Gold Image portion. The chunk ID 1710 identifies the chunk. The snapshot volume ID 1720 is an identifier of the snapshot volume to which the chunk belongs. The start LBA 1730 is the LBA on the (virtual) Gold Image shows the start address of the chunk. The number of blocks 1740 is the number of valid blocks within the chunk. The usage 1750 indicates whether the chunk is used to store overwrite or replicated data. For instance, the chunks CK001 and CK002 shown in rows 1791 and 1792 are the chunks used to store "overwrite" data as shown in the usage column 1750 through which the host wrote to the snapshot volume "SV101." On the other hand, the chunks CK003 and CK004 shown in rows 1793 and 1794 are the chunks used to store "replica" data as shown in the usage column 1750 through which data was copied from the Gold Image of the snapshot volume "SV102."

3. Process Flow—Snapshot Volume Chunk Replication

FIG. 17 shows an example of a flow diagram of a process for snapshot volume chunk replication when too high an I/O usage ratio of a specific block of snapshot volume was detected. The storage service provider module 360 monitors for the respective snapshot volume's I/O usage ratio by block granularity and if it gets too high it copies the corresponding portion of data from the associated Gold Image to the snapshot volume by the chunk size of boundary. This process is carried out within the device rather between devices.

In step 1800, the storage service provider module 360 detects the high workload block of a snapshot volume. In step 1810, it selects a record from the snapshot volume for the detected snapshot volume and obtains its Gold Image ID. In step 1820, it gets data content of a chunk which includes the block detected in step 1800 from the Gold Image volume. In step 1830, it allocates a new chunk to the place where the detected high workload block exists to the snapshot volume. In step 1840, it copies the obtained data in step 1820 to the allocated chunk. In step 1850, it inserts a new record to the snapshot volume chunk table 1700 with a new chunk ID 1710, belonging snapshot volume ID 1720, start LBA 1730, number of blocks 1740 of the allocated chunk, and usage 1750 with "replica."

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for server image capacity optimization. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A non-transitory computer-readable storage medium storing a plurality of instructions for controlling a data processor to perform server image provisioning in a system which includes a plurality of storage systems, a plurality of servers, and a network, each of the storage systems being connected via the network to one or more of the servers, respectively, the plurality of storage systems being connected to each other via the network, each of the servers having one or more virtual servers, the storage systems having a plurality of storage volumes and managing a plurality of virtual volumes related to the plurality of storage volumes, the plurality of instructions comprising:
   instructions that cause the data processor to check whether a gold image exists as a first storage volume in a first storage system of the plurality of storage systems which includes a plurality of storage volumes and is connected to one or more of the servers each having one or more virtual servers, the gold image being a real gold image or a virtual gold image;
   instructions that cause the data processor, if no gold image exists as the first storage volume in the first storage system, to search a remainder of the storage systems until a real gold image as a second storage volume is found in a second storage system of the plurality of storage systems which includes a plurality of storage volumes and is connected to one or more of the servers each having one or more virtual servers, the second storage system including a snapshot volume created on a storage volume basis based on the real gold image as the second storage volume, the second storage volume being a different storage volume from the first storage volume;
   instructions that cause the data processor, after finding the real gold image in the second storage system, to create a virtual gold image as a third storage volume in the first storage system using a virtual volume in the first storage system which is associated with the second storage volume in the second storage system storing the real gold image, the virtual gold image as the third storage volume created using the virtual volume in the first storage system being associated with the real gold image as the second storage volume in the second storage system, the third storage volume being a different storage volume from the second storage volume; and
   instructions that cause the data processor to create a snapshot volume in the first storage system on a storage volume basis based on the virtual gold image as the third storage volume.

2. The non-transitory computer-readable storage medium according to claim 1, the plurality of instructions further comprising:
   instructions that cause the data processor to maintain a gold image table which includes actual location of one or more gold images, the actual location for a real gold image being location of the real gold image, the actual location for a virtual gold image being location of a real gold image associated with the virtual gold image.

3. The non-transitory computer-readable storage medium according to claim 2,
   wherein each gold image is identified by a gold image ID in the gold image table; and
   wherein checking whether a gold image exists in the first storage system comprises selecting a gold image ID of a gold image in the gold image table if the gold image exists in the first storage system.

4. The non-transitory computer-readable storage medium according to claim 2, the plurality of instructions further comprising:
   instructions that cause the data processor to update the gold image table by inserting a record of the created virtual gold image in the first storage system, the record including a gold image ID of the virtual gold image, a storage volume ID of a storage volume level of the virtual gold image, an existence entry of virtual for the virtual gold image, actual location of the virtual gold image, and an external storage volume ID of a storage volume of the real gold image associated with the virtual gold volume.

5. The non-transitory computer-readable storage medium according to claim 1, the plurality of instructions further comprising:
   instructions that cause the data processor to create a second virtual gold image as fourth storage volume in a third storage system of the plurality of storage systems using a virtual volume in the third storage system, the second virtual gold image as the fourth storage volume created using the virtual volume in the third storage system being associated with the real gold image as the second storage volume in the second storage system, the fourth storage volume being a different storage volume from the second storage volume.

6. The non-transitory computer-readable storage medium according to claim 1, wherein each snapshot volume has a snapshot volume ID, the plurality of instructions further comprising:
   instructions that cause the data processor to maintain a snapshot volume table containing the snapshot volume ID of the snapshot volume and a gold image ID of the gold image from which the snapshot volume was created.

7. The non-transitory computer-readable storage medium according to claim 6, the plurality of instructions further comprising:
   instructions that cause the data processor to update the snapshot volume table by inserting a record of the snapshot volume ID of the created snapshot volume and the gold image ID of the virtual gold image from which the snapshot volume was created.

8. The non-transitory computer-readable storage medium according to claim 1, the plurality of instructions further comprising:

instructions that cause the data processor to monitor a workload of the virtual gold image in the first storage system;

instructions that cause the data processor, upon detecting that the workload of the virtual gold image exceeds a preset threshold, to configure replication of the real gold image which is associated with the virtual gold image between the second storage system and the first storage system; and instructions that cause the data processor to replicate the real gold image from the second storage system to the first storage system as a replicated gold image in the first storage system.

9. The non-transitory computer-readable storage medium according to claim 8, the plurality of instructions further comprising:

instructions that cause the data processor to maintain a gold image table which includes actual location of one or more gold images, the actual location for a real gold image being location of the real gold image, the actual location for a virtual gold image being location of a real gold image associated with the virtual gold image;

wherein the gold image table further includes an I/O usage ratio which is the workload of the gold image and replication information indicating whether the gold image is a replicated gold image.

10. The non-transitory computer-readable storage medium according to claim 8, wherein configuring replication of the real gold image which is associated with the virtual gold image comprises setting the real gold image as a replication primary volume and setting the virtual gold image as a replication secondary volume.

11. The non-transitory computer-readable storage medium according to claim 8, wherein the workload is measured by an I/O usage ratio.

12. The non-transitory computer-readable storage medium according to claim 1, the plurality of instructions further comprising:

instructions that cause the data processor to monitor a workload of the real gold image in the second storage system;

instructions that cause the data processor, upon detecting that the workload of the real gold image exceeds a preset threshold, to configure replication of the real gold image between the second storage system and the first storage system; and instructions that cause the data processor to replicate the real gold image from the second storage system to the first storage system as a replicated gold image in the first storage system.

13. The non-transitory computer-readable storage medium according to claim 1, the plurality of instructions further comprising:

instructions that cause the data processor to monitor a workload of each block of a plurality of blocks of the virtual gold image in the first storage system;

instructions that cause the data processor, upon detecting that the workload of a block of the virtual gold image exceeds a preset threshold, to create a chunk in the first storage system to allocate data to be copied from the real gold image of the second storage system to the virtual gold image of the first storage system; and instructions that cause the data processor to copy data, from a chunk in the real gold image containing a block which corresponds to the block detected in the virtual gold image, to the created chunk in the first storage system as a replicated chunk.

14. The non-transitory computer-readable storage medium according to claim 13, the plurality of instructions further comprising:

instructions that cause the data processor to maintain a replicated chunk table which includes a chunk ID of the chunk, a gold image ID of the virtual gold image to which the chunk belongs, start block address of the chunk, and number of blocks within the chunk.

15. The non-transitory computer-readable storage medium according to claim 14, the plurality of instructions further comprising:

instructions that cause the data processor to update the chunk table by inserting a record of a chunk ID of the created chunk, a gold image ID of the virtual gold image to which the created chunk belongs, start block address of the created chunk, and number of blocks within the created chunk.

16. The non-transitory computer-readable storage medium according to claim 1, the plurality of instructions further comprising:

instructions that cause the data processor to monitor a workload of each block of a plurality of blocks of the real gold image in the second storage system;

instructions that cause the data processor, upon detecting that the workload of a block of the real gold image exceeds a preset threshold, to create a chunk in the first storage system to allocate data to be copied from the real gold image of the second storage system to the virtual gold image of the first storage system; and instructions that cause the data processor to copy data from a chunk in the real gold image containing the detected block to the created chunk in the first storage system as a replicated chunk.

17. A non-transitory computer-readable storage medium storing a plurality of instructions for controlling a data processor to perform server image provisioning in a system which includes a plurality of storage systems, a plurality of servers, and a network, each of the storage systems being connected via the network to one or more of the servers, respectively, the plurality of storage systems being connected to each other via the network, each of the servers having one or more virtual servers, the storage systems having a plurality of storage volumes and managing a plurality of virtual volumes related to the plurality of storage volumes, the plurality of storage systems including a first storage system which has a real gold image on a first storage volume and a snapshot volume created on a storage volume basis based on the real gold image on the first storage volume, the plurality of instructions comprising:

instructions that cause the data processor to monitor a workload of each block of a plurality of blocks of the snapshot volume in the first storage system;

instructions that cause the data processor, upon detecting that the workload of a block of the snapshot volume exceeds a preset threshold, to create a chunk in the snapshot volume to allocate data to be copied from the real gold image on the first storage volume in the first storage system which includes a plurality of storage volumes and is connected to one or more of the servers each having one or more virtual servers; and instructions that cause the data processor to copy data, from a chunk in the real gold image on the first storage volume containing a block which corresponds to the detected block in the snapshot volume, to the created chunk in the snapshot volume as a replicated chunk in the first storage system.

18. The non-transitory computer-readable storage medium according to claim 17, the plurality of instructions further comprising:
   instructions that cause the data processor to maintain a snapshot volume chunk table which includes a chunk ID of the chunk, a snapshot volume ID of the snapshot volume to which the chunk belongs, start block address of the chunk, number of blocks within the chunk, and usage information indicating whether data is overwritten as writeable snapshot in the chunk or allocated as replicated data in the chunk.

19. A server image provisioning system comprising:
   a plurality of storage systems;
   a plurality of servers;
   a network, each of the storage systems being connected via the network to one or more of the servers, respectively, the plurality of storage systems being connected to each other via the network; and
   a management computer connected to the network;
   wherein each of the servers has one or more virtual servers, and the storage systems has a plurality of storage volumes and manages a plurality of virtual volumes related to the plurality of storage volumes;
   wherein the management computer checks whether a gold image exists as a first storage volume in a first storage system of the plurality of storage systems which includes a plurality of storage volumes and is connected to one or more of the servers each having one or more virtual servers, the gold image being a real gold image or a virtual gold image;
   wherein, if no gold image exists as the first storage volume in the first storage system, the management computer searches a remainder of the storage systems until a real gold image as a second storage volume is found in a second storage system of the plurality of storage systems which includes a plurality of storage volumes and is connected to one or more of the servers each having one or more virtual servers, the second storage system including a snapshot volume created on a storage volume basis based on the real gold image as the second storage volume, the second storage volume being a different storage volume from the first storage volume;
   wherein, after the real gold image in the second storage system is found, the first storage system creates a virtual gold image as a third storage volume in the first storage system using a virtual volume in the first storage system which is associated with the second storage volume in the second storage system storing the real gold image, the virtual gold image as the third storage volume created using the virtual volume in the first storage system being associated with the real gold image as the second storage volume in the second storage system, the third storage volume being a different storage volume from the second storage volume; and
   wherein the first storage system creates a snapshot volume in the first storage system on a storage volume basis based on the virtual gold image as the third storage volume.

20. The system according to claim 19,
   wherein the first storage system monitors a workload of each block of a plurality of blocks of the virtual gold image in the first storage system;
   wherein, upon detecting that the workload of a block of the virtual gold image exceeds a preset threshold, the first storage system creates a chunk in the first storage system to allocate data to be copied from the real gold image of the second storage system to the virtual gold image of the first storage system; and
   wherein the first storage system copies data, from a chunk in the real gold image containing a block which corresponds to the block detected in the virtual gold image, to the created chunk in the first storage system as a replicated chunk.

* * * * *